Feb. 25, 1958
G. E. SMITHBURN
2,824,506
CULTIVATOR FOR GARDEN TRACTOR
Filed Feb. 13, 1953
3 Sheets-Sheet 1
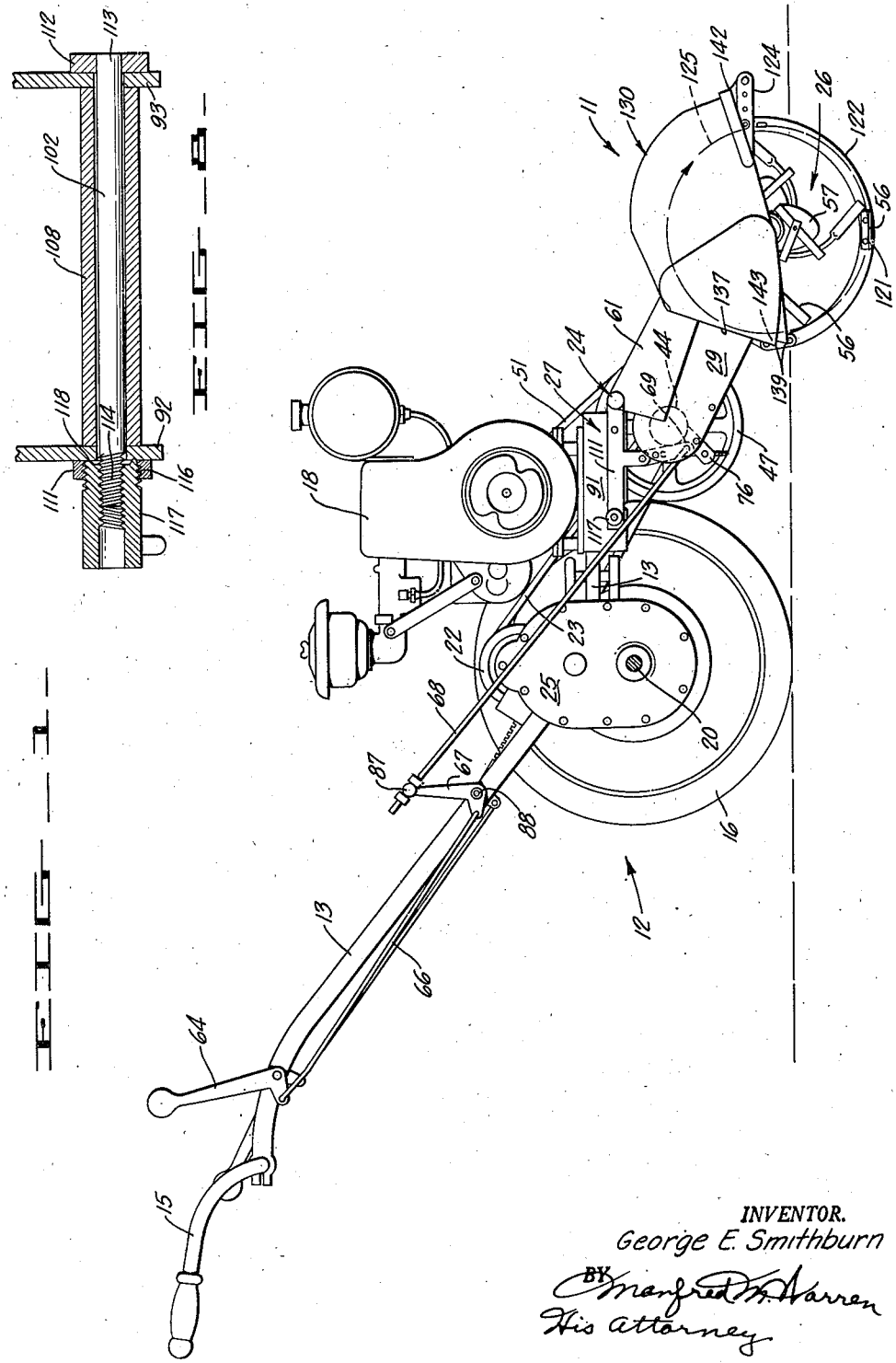
INVENTOR.
George E. Smithburn
BY Manfred M. Warren
His attorney

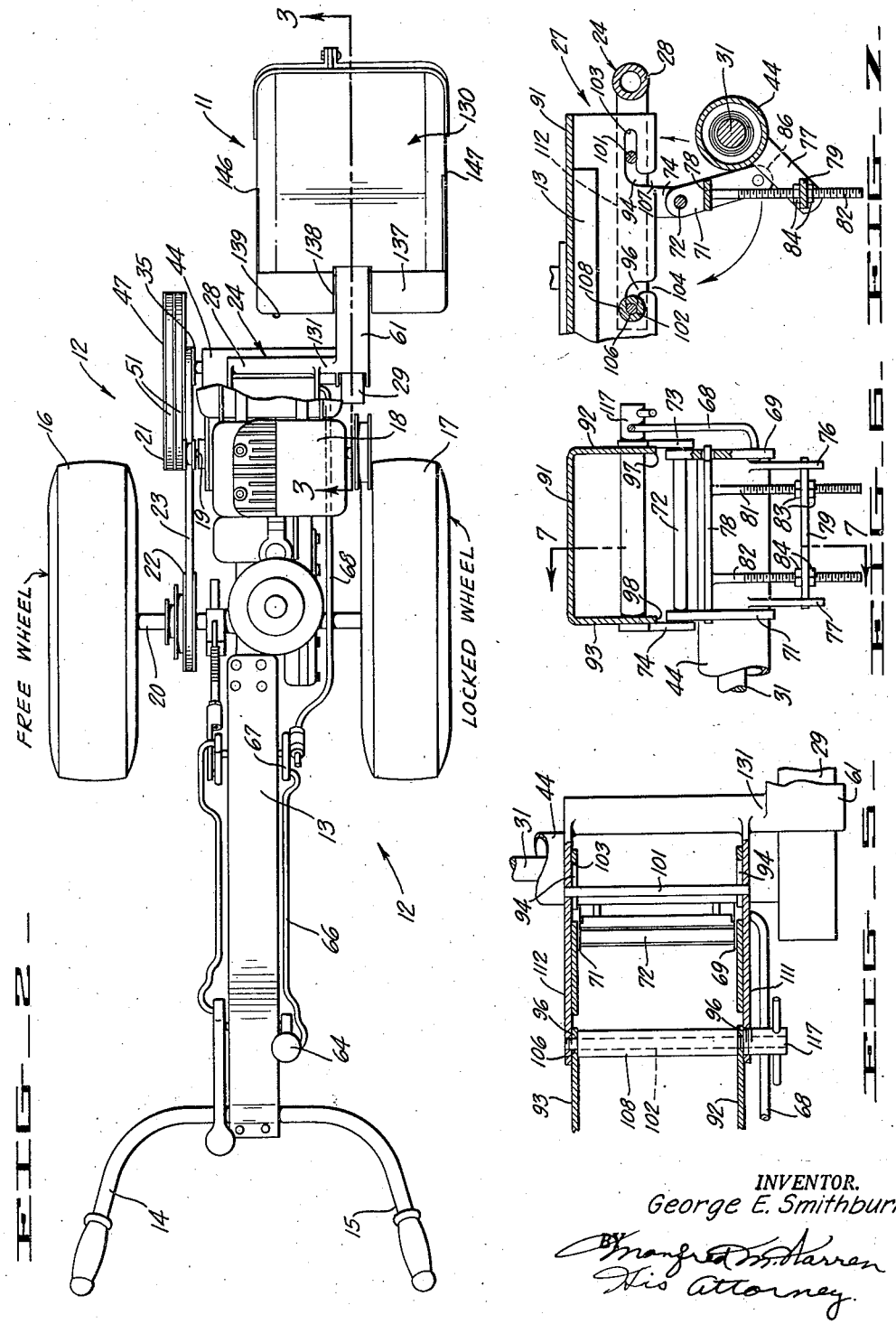

Feb. 25, 1958 G. E. SMITHBURN 2,824,506
CULTIVATOR FOR GARDEN TRACTOR
Filed Feb. 13, 1953 3 Sheets-Sheet 3
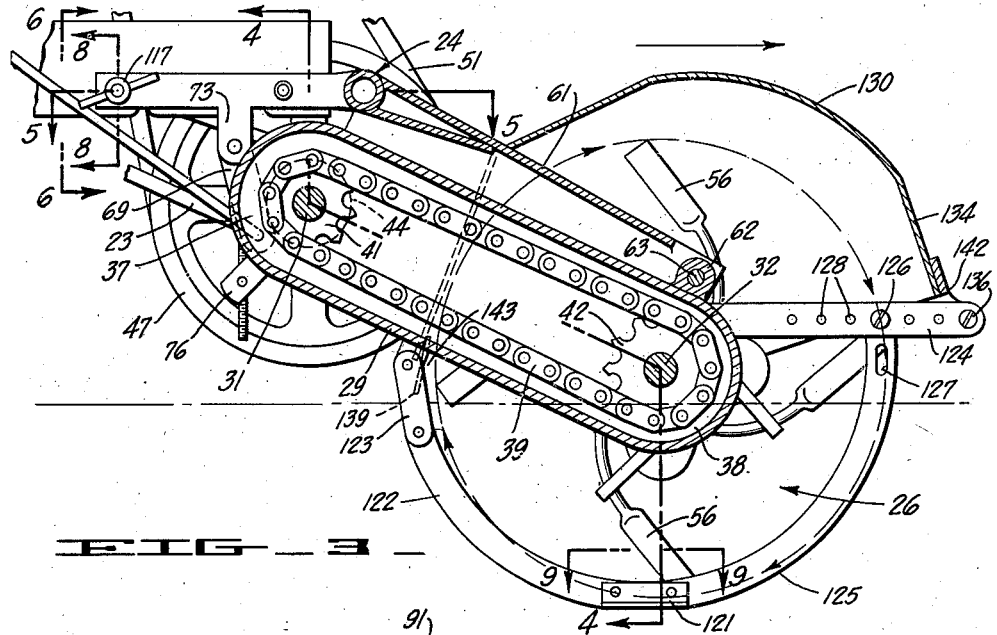
FIG_3_
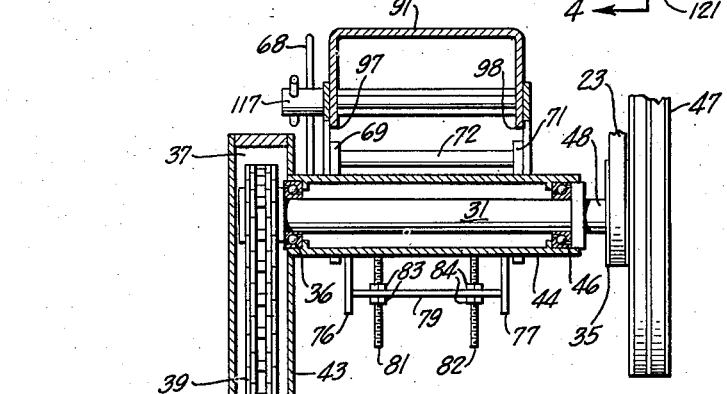
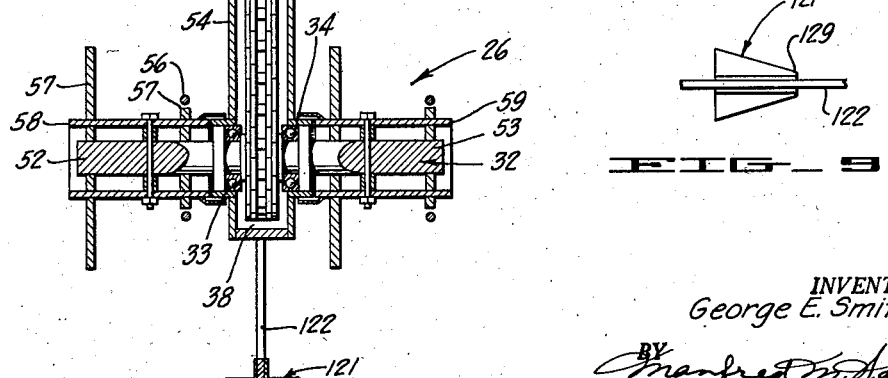
FIG_4_ FIG_9_
INVENTOR.
George E. Smithburn
BY Manfred M. Warren
His Attorney

United States Patent Office 2,824,506
Patented Feb. 25, 1958

2,824,506

CULTIVATOR FOR GARDEN TRACTOR

George E. Smithburn, Berkeley, Calif.

Application February 13, 1953, Serial No. 336,830

2 Claims. (Cl. 97—40)

The invention relates to earth cultivators of the rotary tiller type and more particularly to such units which are constructed to permit their attachment to and use with so-called garden tractors.

An object of the invention is to provide a cultivator of the character described, which is especially adapted for mounting on the front of a garden tractor and is otherwise constructed and arranged to operate and to coact with the tractor to afford outstanding maneuverability and ease of control for tilling under and around bushes, shrubs and other hard to get at places, with good tracking and steering characteristics, a better view of the earth being tilled, and improved safety of both the operator and the tiller.

Another object of the present invention is to provide a cultivator attachment of the character described adapted for excellent tilling efficiency under a wide range of soil conditions with the device being constructed to automatically respond to variations in soil hardness, to maintain a uniform depth and consistency of tillage while at the same time providing a quick and positive response to manual manipulation for likewise controlling and determining when desired the depth and consistency of the cultivated earth.

A further object of the present invention is to provide a coupling for attaching a rotary tiller of the character described to a garden tractor frame with the coupling being adapted for easy and simple mounting and dismounting and which furnishes a rigid, sturdy connection not subject to loosening and damage by vibration and repeated use.

The invention possesses other objects and features of advantage, some of which, with the foregoing, will be set forth in the following descriptions of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevational view of a cultivator constructed in accordance with the present invention and shown mounted operatively attached to a conventional two-wheel garden tractor, the near wheel of the tractor being removed for clarity of illustration.

Figure 2 is a plan view of the cultivator and tractor illustrated in Figure 1.

Figure 3 is a cross-sectional view on an enlarged scale of the cultivator taken substantially on the plane of line 3—3 of Figure 2.

Figure 4 is a cross-sectional view taken substantially on the plane of line 4—4 of Figure 3.

Figure 5 is a fragmentary plan section taken substantially on the plane of line 5—5 of Figure 3.

Figure 6 is a cross-sectional view taken substantially on the plane of line 6—6 of Figure 3.

Figure 7 is a cross-sectional view taken substantially on the plane of line 7—7 of Figure 6.

Figure 8 is a further enlarged fragmentary cross-sectional view taken substantially on the plane of line 8—8 of Figure 3.

Figure 9 is a fragmentary plan sectional view taken substantially on the plane of line 9—9 of Figure 3.

The cultivator 11 of the present invention, and as illustrated in the accompanying drawings, is of the rotary tiller type and is adapted for attachment to and for use with a conventional garden tractor 12, composed, briefly, of a frame 13 having rearwardly projecting handles 14 and 15 for manual engagement by the operator walking behind the tractor for steering and other manipulation of the tractor and attached cultivator, a transversely extending axle 20 connected at its outer ends with ground engaging wheels 16 and 17, a gasoline motor 18 having a drive shaft 19 fitted at its outer end with a pulley 21 which is normally connected by a belt to a pulley 22 provided on a transmission 25 for the axle 20. The cultivator 11 is constructed as a unitary assembly, particularly arranged for mounting at the front end of the tractor 12, and includes briefly a combination of a frame means 24, a rotary tiller means 26 carried thereby, a coupling means 27 formed to rigidly attach the frame means of the cultivator to the tractor frame at the front of the tractor with the tiller means in advance of and generally parallel to the tractor axle, and belt means detachably connecting the tiller means to the motor 18 of the tractor. By reason of this general assembly of parts and arrangement of the cultivator at the front of the tractor, the cultivator may be swung vertically to and from the earth by depressing or raising of the handles 14 and 15 of the tractor for rocking of the latter upon its wheels 16 and 17, and excellent maneuverability of the cultivator is obtained.

In the construction of the cultivator, the tiller frame means 24 here includes a sub-frame 28 and an elongated chain case 29 secured thereto. Drive and tiller shafts 31 and 32 are journalled for rotation in bearings 33 and 34 and 36, adjacent the opposite ends 37 and 38 of the chain case and are operatively connected by a roller chain 39 entrained over sprockets 41 and 42 secured to the shafts. The drive shaft projects laterally from one side 43 of the case through a tubular extension 44 secured to such side, is journalled in a bearing 46 at the outer end of the extension 44, and projects from such bearing and is provided with a set of pulleys 47 at its outer end 48 for connection to pulleys 49 on the motor shaft 19 by one or more belts 51. As an important feature, the drive for the tractor wheels is taken off of the cultivator drive shaft 31, with the latter serving as a counter shaft to alter tractor wheel speed to suit conditions. This is effected by the provision of an additional pulley 35 on shaft 31 connected by belt 23 to pulley 22 of the tractor transmission 25. The tiller shaft 32 extends through bearings 33 and 34, and has opposite end portions 52 and 53 projecting laterally from the opposite sides 43 and 54 of the chain case and which are provided with a plurality of ground engaging tines 56 which project radially therefrom for engagement with and tilling of the earth. As here shown, the tines 56 are carried by lobe shaped tine holders 57 which are, in turn, secured to sleeves 58 and 59 overlying and pinned to the shaft end portions 52 and 53 for rotation therewith. The general construction of the tiller shaft 32, sleeves 58 and 59, tine holders 57 and tines 56 is more fully disclosed in my co-pending applications Serial No. 265,415, filed January 8, 1952, now Patent No. 2,750,859, and Serial No. 26,083, filed May 10, 1948, now Patent No. 2,684,022, issued July 20, 1954.

As an important feature of the present construction, the chain case 29 is so connected to the sub-frame 28 as to permit a swinging of the upper end 37 of the chain case and the drive shaft 31 through a vertical displacement so as to tighten or loosen the belts 51 and in this manner provide a convenient and effective clutch means for the unit. As best shown in Figure 3, this is accomplished by pivoting the chain case adjacent its lower end 38 and adjacent the tiller shaft 32 to the sub-frame. As here shown, the latter is provided with a forwardly extending arm 61 of inverted channel form, which engages over a boss 62 formed on the chain case and is pivoted thereto by a horizontally extending pin 63. By reason of the location of the pivotal connection adjacent and above the tiller shaft 32, as illustrated, the opposite end of the chain case and the drive shaft 31 may be swung or displaced vertically toward and away from the motor shaft 19 to provide the desired clutch action on belts 51 without materially displacing the tiller shaft and its tines. The above described swinging of the chain case for operatively connecting and disconnecting the tiller shaft with the tractor motor is manually controlled by a bell crank lever 64 carried on the tractor frame 13 adjacent the handles 14 and 15. The lever 64 is connected by a link 66 to a second bell crank 67 to provide an over center action and the latter is connected by a link 68 to a lever 69 forming part of an over center toggle actuator operating between the upper end 37 of the chain case and the sub-frame 28. The actuator is composed of a pair of horizontally spaced levers 69 and 71 which are rigidly secured to and depend from a shaft 72 journalled at its opposite ends in ears 73 and 74 forming part of the sub-frame 28. Connection of the levers 69 and 71 to the chain case 29 is effected through ears 76 and 77 secured to the chain case extension 44 and extending therefrom in a rearward and downward direction (see Figures 3, 4, 6 and 7). Upper and lower strap members 78 and 79 are pivotally connected to the levers 69 and 71, and the chain case ears 76 and 77, respectively, by pin shaped ends on the strap members journalled in openings in the levers and ears. The upper strap member 78 is pivoted to the levers 69 and 71 intermediate their ends and specifically intermediate the shaft 72 and the point of connection of the link 68 with the lever 69. The strap members 78 and 79 are connected by parallel spaced apart bolts 81 and 82 which are welded or otherwise secured at their upper ends to the strap 78 and extended through openings provided in the lower strap 79 for adjustable fastening by means of pairs of nuts 83 and 84 threaded on to the bolts on opposite sides of the strap. In this fashion, by adjusting the nuts 83 and 84, the drive shaft 31 may be brought into precise parallelism with the motor shaft 19 and additionally the tension on the belt 51 may be regulated. The over center toggle action of this construction will be apparent from an examination of the parts as illustrated in Figure 7. The lowering of the upper end of the chain case and tightening of the belt 51 is effected by a downward and forward displacement of the link 68 and a corresponding downward and forward swinging of levers 69 and 71. This movement of the levers causes a downward movement of the ears 76 and 77 secured to the extension 44 of the crank case and it will be noted that the end 86 of lever 71 passes over center as between the axis of the pivotal connections of the strap members 78 and 79. The tension of the belt cooperates with the arrangement of the parts as described to hold the latter in an overcenter operating position. Contrariwise, upon retraction of the link 68, the levers 76 and 77 will be swung in a clockwise direction as viewed in Figure 7, causing an elevation of the ears 76 and 77 on the chain case extension 44 and a general raising of the upper end 37 of the chain case and a slackening of the belt 51 to disconnect the drive between drive shaft 31 and the motor shaft 19. The weight of the chain case is maintained in such elevated inoperative position by the over center action of bell crank 67 which, in such position, is swung in a counterclockwise direction as viewed in Figure 1 so that the end 87 of the bell crank to which the link 68 is attached, is swung past the pivoted connection 88 of the bell crank. The bell crank 67 is held against further counterclockwise rotation in such position by the downward displacement of the manual lever 64 to its lowermost position against the tractor frame 13.

The coupling means 27 is designed for quick and easy attachment of the cultivator to the tractor frame and for the precise positioning of the tiller shaft 32 parallel to and in advance of the tractor axle 14. Such means here includes an inverted channel member 91 secured to and projecting forwardly from the tractor frame 13, see Figure 1, with the channel flanges providing spaced apart vertical walls 92 and 93 arranged parallel to each other and to the direction of movement of the tractor. Formed in the walls are forwardly and rearwardly disposed pairs of transversely aligned slots 94 and 96, see Figure 7. Both pairs of slots open to the lower edges 97 and 98, of the walls 92 and 93, with the forward pair of slots 94 extending upwardly and forwardly therefrom and with the rearward pair of slots 96 extending upwardly and rearwardly therefrom. The sub-frame 28 is provided with a pair of parallel, spaced apart pins 101 and 102 formed for engagement in the forward and rearward pairs of slots 94 and 96, respectively. The pins 101 and 102 are spaced apart by a distance cooperating with the spacing and dimensions of the pairs of slots 94 and 96 to provide a sturdy and rigid coupling which is extremely simple to mount and dismount. As may be seen in the drawings, the parts are proportioned so that the distance from the forward ends 103 of the slots 94 to the juncture 104 of the slots 96 with the wall lower edges is equal to the spacing between the pins, while the distance from the rearward ends 106 of the slots 96 to the juncture 107 of slots 94 with the wall lower edges is substantially less than the spacing between the pins. In this manner, the pin 101 may be engaged in the slot 94 and pushed to the forward end 103 thereof whereupon the rear pin 102 will be at juncture 104 for entry into slots 96. As pin 102 is inserted into slots 96 and pushed to the rear ends 106 thereof, pin 101 will be retained midway in slots 94.

Means is provided for clamping the sub-frame 28 and channel 91 against relative longitudinal displacement so as to retain the pins 101 and 102 in their slots as last above described. Forming part of this means is a tubular spacer member 108 carried on pin 102 and bearing against the inner sides of the channel walls 92 and 93 to hold the latter against squeezing together.

The sub-frame 28 is here formed with parallel rearwardly extending arms 111 and 112 which carry pins 101 and 102 and which are spaced to receive the channel walls 92 and 93 therebetween, see Figures 5 and 8. Preferably, the pin 101 has one end 113 secured directly to the arm 112 while its other end 114 extends therefrom through an opening 116 in the other arm 111. A manually engageable nut 117 is threaded onto the pin end 114 and is also threadably engaged in the opening 116 so that rotation of the nut will cause it to advance on the pin 101 and clamp the walls 92 and 93 and the spacer member 108 firmly between the nut and the frame arm 112. The effectiveness of the clamping means in preventing longitudinal displacement of the pins 101 and 102 is increased by forming the nut 117 with a concentric circular knife edge 118 arranged to bear against and bite into the channel wall 92 when the nut is screwed down tight.

In order to obtain proper tilling action, the power trains from the engine 18 to the tiller shaft 32 and to the tractor wheels 16 and 17, including the selection of sizes of pulleys 21 and 22, 47 and 49 and sprockets 41 and 42, provide drive ratios which cause the peripheral speed of the tines 56 to substantially exceed the peripheral speed of the tractor wheels. There is thus developed forward thrust by the tiller which must be resisted in order to obtain tilling action. Alternate means are provided in the present construction for so resisting this forward thrust. Principal among such means is the provision of a plow-like member 121 carried by the cultivator for engagement in and working of the earth being tilled. As shown in Figures 1, 3, and 4, the plow means 121 is mounted on a downwardly curved member 122 carried by the chain case so as to position the plow member directly under the chain case and in substantially vertical alignment with the tiller shaft 32.

For most ground conditions and tilling actions, the plow is mounted, as shown, at approximately the outer periphery (indicated by numeral 125) of the tine circle. To better accommodate the cultivator to other ground conditions and tilling actions, vertical adjustment of the plow member to both above and below the tine circle is desired. This is here obtained by fastening the rear end of the plow supporting member 122 to a link 123 pivoted to the chain case and adjustably securing the forward end of member 122 to a supporting member 124 secured to and projecting forwardly of the chain case. The adjustable connection noted is here obtained by a bolt 126 which may be selectively engaged in registrable openings 127 and 128 provided in the members 122 and 124.

Another important feature of the plow is to till the earth directly below the chain case, which is normally out of reach of the tines and would be otherwise left untilled. As here shown, the plow 121 is of generally flattened wedge shape and is oriented in a substantially horizontal plane with its narrow end 129 slightly lower and pointed in the direction of movement of the cultivator so that the plow, in cooperation with its supporting member 122, will function to cleave the normally untilled center section and push this displaced earth laterally to both sides of the chain case and into the path of the whirling tines. In this manner the entire earth area underneath the tiller shaft, including the portion underlying the chain case, is put into motion and confined by an overlying hood 130 which serves to level out and redeposit the tilled earth uniformly completely across the full width of the cultivator.

The flattened shape and submerged running condition of the plow as seen in Figures 4 and 9 provide another important advantage in functioning as a stabilizing vane for holding the tiller in ground engaging position against rotating forces acting around the power driven wheels 16—17. Under various tilling conditions when the bite of the tines in the ground may decrease, the forward driving movement of the wheels 16—17 creates counter-rotative forces as will be apparent from the arrangement of parts as seen in Figure 1, tending to lift the forwardly positioned tiller 11 out of the ground. The submerged earth penetrating vane 121 successfully resists this counter-rotating force.

With the plow 121 formed and mounted as above described, an automatic regulating action is exerted on the forward speed of the tractor relative to the speed of rotation of the tines 56, and on the depth of penetration of the tines, when varying hardnesses of earth are encountered. As may best be seen in Figure 1, the alignment of forces resulting from the mounting of the tilling means 11 and the plow 121 below and in advance of the tractor axle 14 tends, when the resistance of the earth on the plow increases, to cause the plow to dig more deeply into the ground and thus resist and counteract the normal increase in the climbing action of the whirling tines. Increased hardness of the ground will also increase the resistance against forward motion of the plow and, accordingly, cause slippage of the tractor wheels on the ground. In this manner the forward speed of the tractor and cultivator will be proportionally slowed so that the amount of bite of each tine will be decreased in direct ratio to the hardness of the earth being tilled to thus effect a more uniform cultivating action.

The aforementioned automatic response of the tiller to different hardnesses of the ground encountered is at all times under the easy and precise manual control of the operator. This occurs by reason of the front mounting of the cultivator in advance of the tractor wheels so that a desired leverage or mechanical advantage is afforded the operator at the handles 14 and 15 for easy raising and lowering of the cultivator by rocking the tractor upon its wheels. Thus raising of the handles by the operator will cooperate nicely with the plow 121 to slow down the forward movement of the tractor and provide a more thorough and deeper tilling action. Contrariwise, pushing down on the handles 14 and 15 by the operator will elevate the cultivator to increase the general forward speed of the tractor and decrease the intensity of tilling action. Of course, this same arrangement provides for the ready lifting of the cultivator completely out of the ground for swinging or turning of the assembly, as may be desired.

As another feature of the present construction, improving substantially the tracking and steering characteristics of the assembly and also aiding in resisting the forward thrust of the cultivator, as above described, I prefer to position the cultivator to one side of the tractor and in front of one of the tractor wheels (here wheel 17, as illustrated in Figure 2), and to lock this wheel to its axle against any overriding action so that the forward thrust of the cultivator will be generally aligned with and restricted by the tractor wheel 17.

This positioning of the cultivator is here effected by forming the cultivator frame 28 with a transversely offset portion 131 so as to lock the chain case supporting arm 61 in the position generally indicated in Figure 2 so that the cultivator is locked generally in advance of wheel 17 and is intersected by the center plane of the wheel. In the conventional garden tractor, as illustrated and as above referred to as the Wards Plow-Trac and as manufactured by The Midland Co., South Milwaukee, Wis., as Model #W–3, described in Owners Guide MID 5458–3 published by Montgomery Ward & Co. for Plow-Trac garden tractor, catalogue No. 875458, instruction book No. 87 Trac-32 B, a free wheeling connection of each of the wheels to the axle means is provided by a plurality of pawls carried by the axle and arranged for engagement with ratchet teeth in the hubs of the wheels. Locking the wheels to the axle may be conveniently effected in this construction by merely reversing the position of one of the pawls so as to engage and hold a ratchet tooth in an opposite direction from the holding by one of the other pawls thereby locking the wheel hub to the axle. This specific construction is well known in the art and is therefore not illustrated in the drawings and may be found in the parts and instruction manuals for the tractors as above noted.

By locking the wheel 17 to the axle 14 in the above manner, the tractor transmission and motor act to resist the forward thrust of the cultivator so that the tractor and cultivator will have improved tracking and may be more easily guided in a straight line along rows, etc. Preferably, the other wheel 16 is left in its normal free wheeling condition for easy turning of the cultivator at the ends of the rows.

Another important feature of the present invention is in the form, positioning and coaction of the miller casing 130 and the tiller tines to provide a recirculation of the earth within the casing until the earth is properly broken up to desired fineness for deposit back on the ground.

Basically, the casing 130 is of generally involute or snail cage form generally surrounding the portion of the tiller above the earth level indicated by broken tine circle line 125, see Figure 3, and is pivotally secured at its front end 134 to the support member 124 by means of a pin 136. The rear end 137 of casing 132 is provided with a cut out portion 138 adapted to fit over the frame arm and chain case with the trailing edge 139 providing a horizontally disposed leveling board for evenly depositing a uniform layer of tilled earth. The casing is formed to diverge forwardly from the tine circle 125 and terminates in a leading edge 142 spaced vertically from the ground. In this manner the casing 130 provides a constricted throat 143 between the tines and the casing adjacent to the trailing edge 139 which cooperates with the tines to sift large lumps and clods from the finely divided earth being left behind, and the clods are carried back through the casing by the tines and are hurled against the earth ahead of the tine circle for a second passage through the tiller.

As will be observed, the casing and the provision of opposite sides 146 and 147 thereof overlying the ends of the mill serve to completely enclose the whirling tines and earth driven thereby and thus provide a protecting shield for the tractor and the operator. The casing also prevents anything from getting into the tiller except from straight ahead, and the location of the unit on the front of the tractor gives the operator an unimpeded view of the tilling path so that he can easily avoid, by appropriate steering or raising of the tiller, obstacles or the like.

I claim:

1. A cultivator comprising, a garden tractor having a motor and a pair of ground engaging power driven wheels, a rotary tiller shaft and ground engaging tines thereon for tilling the earth, a frame journaling said tiller shaft and being secured to said tractor so as to position said tiller shaft parallel to and in advance of the axis of said wheels, drive means connecting said tiller shaft and motor to effect rotary ground tillage action of said tines, a downwardly bowed arcuate supporting member carried by said frame forwardly of said wheels and in underlying relation to said tiller shaft and in a fore and aft plane perpendicular to said tiller shaft, and an earth penetrating vane carried by said arcuate member at its lowermost extremity for engagement in the earth for stabilizing the ground engaging position of said tiller shaft against rotating forces around said drive wheels.

2. A cultivator as characterized in claim 1 wherein one end of said downwardly bowed arcuate member is pivotally secured to said frame and the other end is adjustably secured to said frame for raising and lowering said vane with respect to said tiller shaft.

References Cited in the file of this patent
UNITED STATES PATENTS

| | | |
|---|---|---|
| 392,320 | Enos | Nov. 6, 1888 |
| 1,559,276 | Nelson | Oct. 27, 1925 |
| 2,070,830 | Gravely | Feb. 16, 1937 |
| 2,196,347 | Von Meyenburg | Apr. 9, 1940 |
| 2,207,447 | Viles et al. | July 9, 1940 |
| 2,214,702 | Seaman | Sept. 10, 1940 |
| 2,368,290 | Donald | Jan. 30, 1945 |
| 2,435,383 | Chaffin | Feb. 3, 1948 |
| 2,495,928 | Geraldson | Jan. 31, 1950 |
| 2,522,934 | Engnell et al. | Sept. 19, 1950 |
| 2,556,446 | Roach | June 12, 1951 |
| 2,611,461 | Miller | Sept. 23, 1952 |
| 2,614,473 | Yacoby | Oct. 21, 1952 |
| 2,614,474 | Merry | Oct. 21, 1952 |
| 2,633,789 | Ober | Apr. 7, 1953 |
| 2,645,987 | Brooks | July 21, 1953 |
| 2,660,271 | Hupp | Nov. 24, 1953 |
| 2,750,859 | Smithburn | June 19, 1956 |